(12) United States Patent
Preissner et al.

(10) Patent No.: US 11,396,974 B2
(45) Date of Patent: Jul. 26, 2022

(54) METHOD AND APPARATUS FOR IMPLEMENTING ULTRA-HIGH STABILITY STAGES WITH COMBINED DEGREES OF FREEDOM FOR MULTIPLE AXES OF MOTION

(71) Applicant: UChicago Argonne, LLC, Chicago, IL (US)

(72) Inventors: Curt Alfred Preissner, Chicago, IL (US); Sunil Jeffrey Bean, Bolingbrook, IL (US); Volker Rose, Downers Grove, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 0 days.

(21) Appl. No.: 17/034,133

(22) Filed: Sep. 28, 2020

(65) Prior Publication Data

US 2022/0099244 A1    Mar. 31, 2022

(51) Int. Cl.
*F16M 11/00* (2006.01)
*F16M 11/24* (2006.01)
*F16M 11/20* (2006.01)

(52) U.S. Cl.
CPC .......... *F16M 11/24* (2013.01); *F16M 11/205* (2013.01); *F16M 11/2028* (2013.01); *F16M 11/2071* (2013.01); *F16M 11/2085* (2013.01); *F16M 11/2092* (2013.01)

(58) Field of Classification Search
CPC ............. F16M 11/2028; F16M 11/205; F16M 11/2071; F16M 11/2085; F16M 11/24
See application file for complete search history.

(56) References Cited

U.S. PATENT DOCUMENTS

| | | | |
|---|---|---|---|
| 1,485,016 A | | 2/1924 | Cardullo et al. |
| 2,248,715 A | * | 7/1941 | Mafera ............ F16M 7/00 254/104 |
| 4,155,173 A | | 5/1979 | Sprandel |
| 4,392,642 A | | 7/1983 | Chitayat |
| 4,571,799 A | | 2/1986 | Chitayat |
| 4,838,515 A | | 6/1989 | Prentice |
| 5,731,641 A | | 3/1998 | Botos et al. |
| 6,486,574 B2 | | 11/2002 | Botos et al. |
| 6,591,757 B1 | | 7/2003 | Rajaraman |
| 10,393,242 B2 | * | 8/2019 | Preissner ............ F16H 25/183 |
| 2015/0160564 A1 | | 6/2015 | Balan |

* cited by examiner

*Primary Examiner* — Amy J. Sterling
(74) *Attorney, Agent, or Firm* — Joan Pennington

(57) ABSTRACT

A method and apparatus are provided for implementing an ultra-high stability stage with combined degrees of freedom for multiple axes of motion. The ultra-high stability stage includes a base, a driving wedge supported by the base and a following wedge supported by the driving wedge. The base and each wedge are formed of a selected stable material having predefined rigidity and low thermal expansion coefficient. Integrated air bearings, respective driving mechanics associated with each of the wedges and guiding components having selected degrees of freedom enable movement about multiple axes of motion, such as X, Y, Z translation axes, and rotation X and rotation Y axes. Another ultra-high stability stage with combined degrees of freedom for multiple axes of motion includes an intermediate wedge between the driving wedge and the following wedge to enable additional movement about a rotation X axis.

12 Claims, 23 Drawing Sheets

METHOD AND APPARATUS FOR IMPLEMENTING ULTRA-HIGH STABILITY STAGES WITH COMBINED DEGREES OF FREEDOM FOR MULTIPLE AXES OF MOTION

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

The present invention relates generally to precision positioning stage systems, and more particularly, relates to a method and apparatus for implementing ultra-high stability stages with combined degrees of freedom for multiple axes of motion.

DESCRIPTION OF THE RELATED ART

In a typical wedge-type vertical travel stage, vertical motion is generated through the relative lateral motion of two horizontally traveling wedges. Some wedge-type vertical positioning stages use rolling elements to guide the motion of the wedges. This design has two shortcomings: 1) rolling element bearings are limited in stiffness, and 2) rolling element bearings are made from steel, which has a large thermal expansion coefficient. Both shortcomings limit the performance of the typical wedge-style vertical stages in applications that require ultra-high stability, such as X-ray microscopy, synchrotron beamline optic component supports, and semiconductor processing. The limited stiffness of the rolling-element guides makes the structure more susceptible to vibration. The thermal expansion of the steel bearings limits the long-term stability.

U.S. Pat. No. 10,393,242 B2 issued Aug. 27, 2019 to Preissner et al., and assigned to the present assignee, discloses a method and apparatus for implementing an ultra-high stability long-vertical travel stage. The disclosed apparatus is much stiffer and has better thermal drift performance than known state-of-the-art guiding mechanisms, providing significant improvements over typical wedge-style vertical stages. The disclosed ultra-high stability long-vertical travel stage provides an arbitrary vertical travel range, with dynamic and thermal stability as typically associated with a rigid structure.

The disclosed ultra-high stability long-vertical travel stage of U.S. Pat. No. 10,393,242 B2 includes a first wedge supporting a second wedge, each wedge formed of a selected stable material having predefined rigidity and low thermal expansion coefficient, and integrated air bearings. A linear guiding mechanism includes a plurality of flexures. The first wedge is driven in a plane providing vertical motion on the second wedge with the integrated air bearings lifted and the flexures allowing for movement.

The subject matter, including the disclosed ultra-high stability long-vertical travel stage and particularly the disclosed integrated air bearings, respective driving mechanics, guiding components, of above-identified U.S. Pat. No. 10,393,242 B2 is incorporated herein by reference.

It is desirable to provide apparatus for implementing enhanced ultra-high stability stage with combined degrees of freedom for multiple axes of motion and that enables minimizing space required for the ultra-high stability stage.

It is desirable to provide such enhanced ultra-high stability stage having needed rigidity and thermal stability enabling selected travel ranges for selected ones of multiple axes of X, Y, Z translation motion and rotation Y and rotation Z motions.

It is desirable to provide an enhanced ultra-high stability stage having needed rigidity and thermal stability enabling selected travel ranges for selected ones of multiple axes of X, Y, Z translation motion and rotation X, rotation Y, rotation Z motions.

SUMMARY OF THE INVENTION

Principal aspects of the present invention are to provide a method and apparatus for implementing an ultra-high stability stage. Other important aspects of the present invention are to provide such method and apparatus substantially without negative effect and that overcome some of the disadvantages of prior art arrangements.

In brief, a method and apparatus are provided for implementing an ultra-high stability stage with combined degrees of freedom for multiple axes of motion. The ultra-high stability stage includes a base, a driving wedge supported by the base and a following wedge supported by the driving wedge. The base and each wedge are formed of a selected stable material having predefined rigidity and low thermal expansion coefficient. Integrated air bearings, respective driving mechanics associated with each of the wedges and guiding components having selected degrees of freedom enable movement about selected ones of multiple axes of motion, such as X, Y, Z translation axes, and rotation Y and rotation Z axes with the integrated air bearings lifted and the guiding components allowing for movement of the driving wedge and the following wedge.

In accordance with features of the invention, each wedge is formed of a selected stable material, such as, granite, a low thermal expansion glass, or a nickel-iron alloy.

In accordance with features of the invention, the base and each wedge are provided to enable minimizing space required for the ultra-high stability stage.

In accordance with features of the invention, guiding components are provided with the driving wedge ensuring vertical motion of the following wedge motion.

In accordance with features of the invention, driving mechanics are provided with the following wedge for X, Y and Z translation motions and rotational Z motion.

In accordance with features of the invention, driving mechanics are provided with the driving wedge for translation Y and rotation Y and rotation Z motions.

In with another embodiment, a method and apparatus provided for implementing an ultra-high stability stage with combined degrees of freedom for multiple axes of motion in accordance with a preferred embodiment. The ultra-high stability stage includes a base, a driving wedge supported by the base, a following wedge, and an intermediate wedge between the driving wedge and the following wedge, supporting the following wedge. The base and each wedge are formed of a selected stable material having predefined rigidity and low thermal expansion coefficient. Integrated air bearings, respective driving mechanics associated with each of the wedges and guiding components having selected degrees of freedom enable movement about selected ones of multiple axes of motion, such as X, Y, Z translation axes, and rotation X, rotation Y and rotation Z axes with the integrated air bearings lifted and the guiding components allowing for movement of the driving wedge, the following wedge, and the intermediate wedge.

In accordance with features of the invention, guiding components are provided with the driving wedge and the intermediate wedge ensuring vertical motion of the following wedge and the intermediate wedge.

In accordance with features of the invention, driving mechanics are provided with the following wedge for Z translation and rotation X motions.

In accordance with features of the invention, driving mechanics are provided with the intermediate wedge for translation X, Y and rotation Z motions.

In accordance with features of the invention, driving mechanics are provided with the driving wedge for translation Y and rotation X, rotation Y, and rotation Z motions.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing an ultra-high stability stage with combined degrees of freedom for multiple axes of motion. Apparatus is provided to enable minimizing space required for the ultra-high stability stage, enabling movement about selected ones of multiple axes of motion, such as X, Y, Z translation axes, and rotation Y and rotation Z axes with integrated air bearings lifted and guiding components allowing for movement of a driving wedge and a following wedge. Apparatus also is provided to enable movement about selected ones of multiple axes of motion, such as X, Y, Z translation axes, and rotation X, rotation Y and rotation Z axes with integrated air bearings lifted and guiding components allowing for movement of a driving wedge, a following wedge, and an intermediate wedge.

Figure 1:
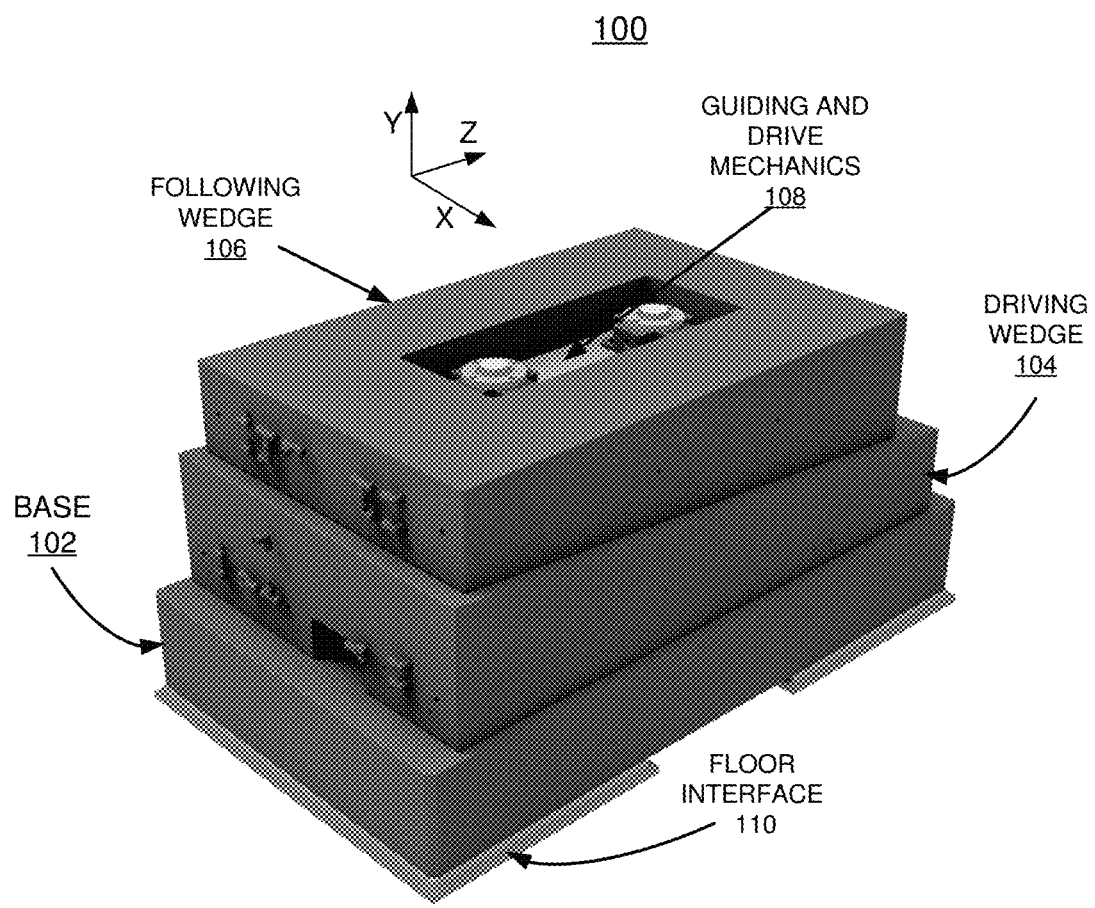
FIGS. 1, 2, and 3A schematically illustrate not to scale an example apparatus for implementing an ultra-high stability stage with combined degrees of freedom for multiple axes of motion in accordance with a preferred embodiment.
Figure 2:
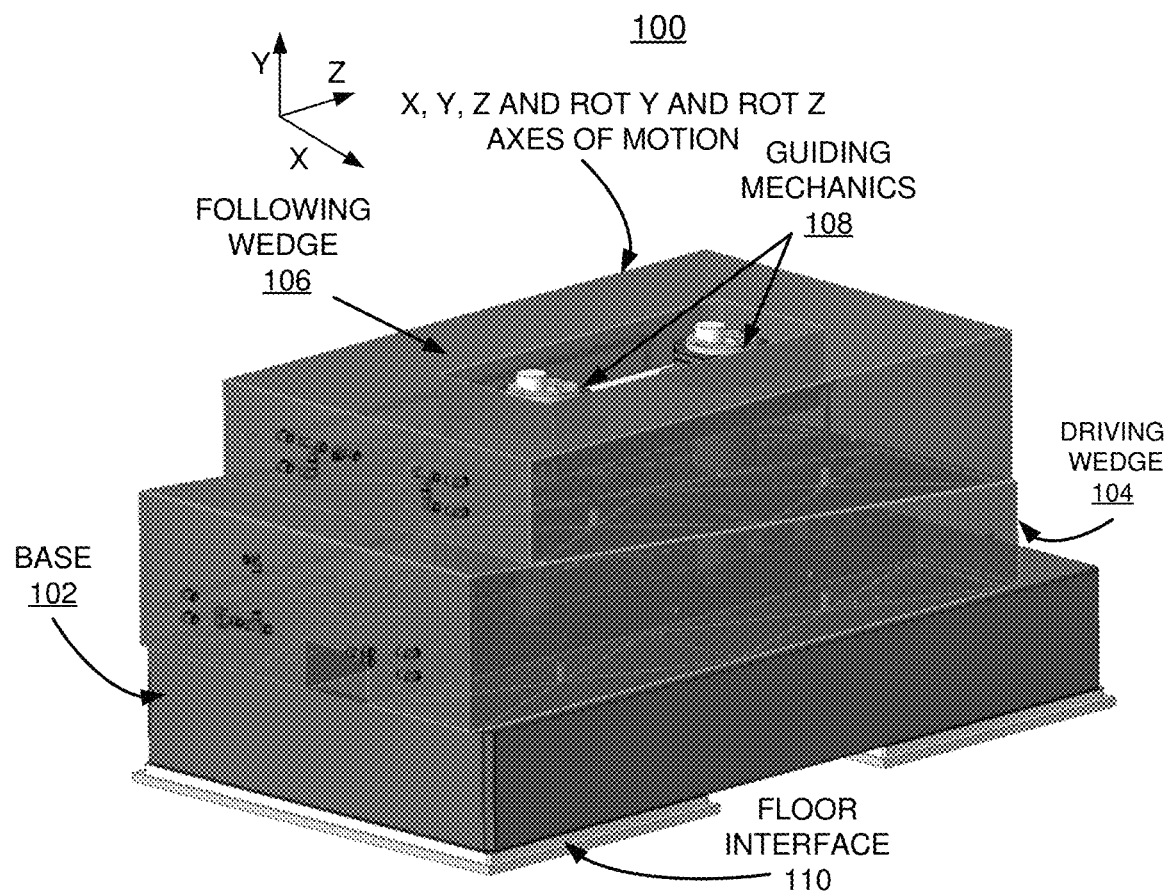
Figure 3A:
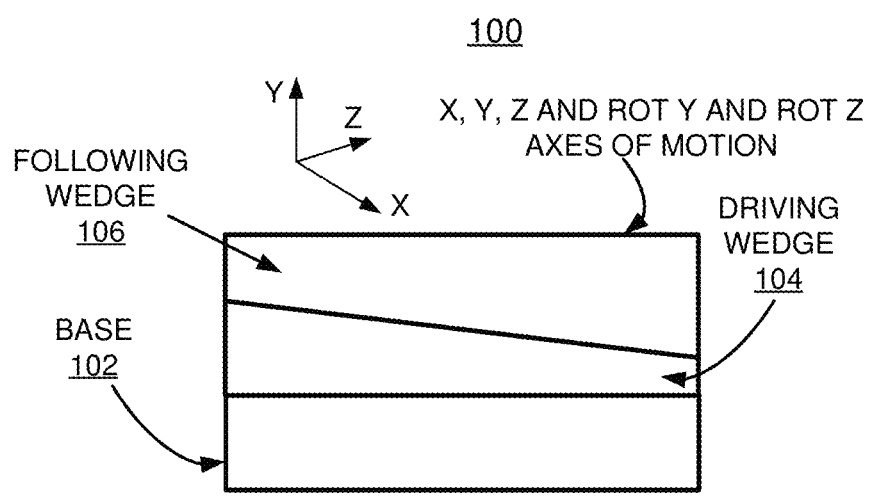

Having reference now to the drawings, in FIGS. 1, 2, and 3A, there is schematically shown example apparatus generally designated by the reference character 100 for implementing an ultra-high stability stage with combined degrees of freedom for multiple axes of motion in accordance with a preferred embodiment. The ultra-high stability stage 100 includes a base 102, a driving wedge 104 supported by the base 102 and a following wedge 106 supported by the driving wedge 104. The ultra-high stability stage 100 includes wedge geometry, guide mechanisms, and drive mechanics used to provide vertical Y translation motion, together with X and Z translation motions, and rotation Y and rotation Z motions. Each of the base 102, the driving wedge 104 and following wedge 106 have surfaces with predefined flatness. The base 102 and each wedge 104, 106 are formed of a selected stable material having predefined rigidity and low thermal expansion coefficient, such as granite, a low thermal expansion glass, or a nickel-iron alloy. Guiding and drive mechanics 108 include guiding and flexure components having selected degrees of freedom enable movement about multiple axes of motion, such as X, Y, Z translation axes, and rotation X and rotation Y axes with integrated air bearings lifted and the guiding components allowing for movement. The ultra-high stability stage 100 includes a floor interface 110 with the stationary base 102.

The ultra-high stability stage 100 is particularly suited to a wide variety of applications, including for example X-ray microscopes, beamline optic component supports, synchrotron beamline precision instrument supports, accelerator magnet supports, accelerator beam position monitor supports, and semiconductor fabrication machines. The ultra-high stability stage 100 can provide an arbitrary travel range about multiple axes of motion, such as X, Y, Z translation axes, and rotation Y and rotation Z axes with dynamic and thermal stability typically associated with a rigid structure. The ultra-high stability stage 100 remains highly stable with substantial travel range about selected ones of multiple axes of motion, providing large load capacity.

Referring to FIG. 3A, the ultra-high stability stage 100 is particularly suited to a wide variety of applications by reducing the space necessary to implement multiple axes of motion, including selected X, Y, Z translation axes, and rotation Y and rotation Z axis.

Figure 3B:
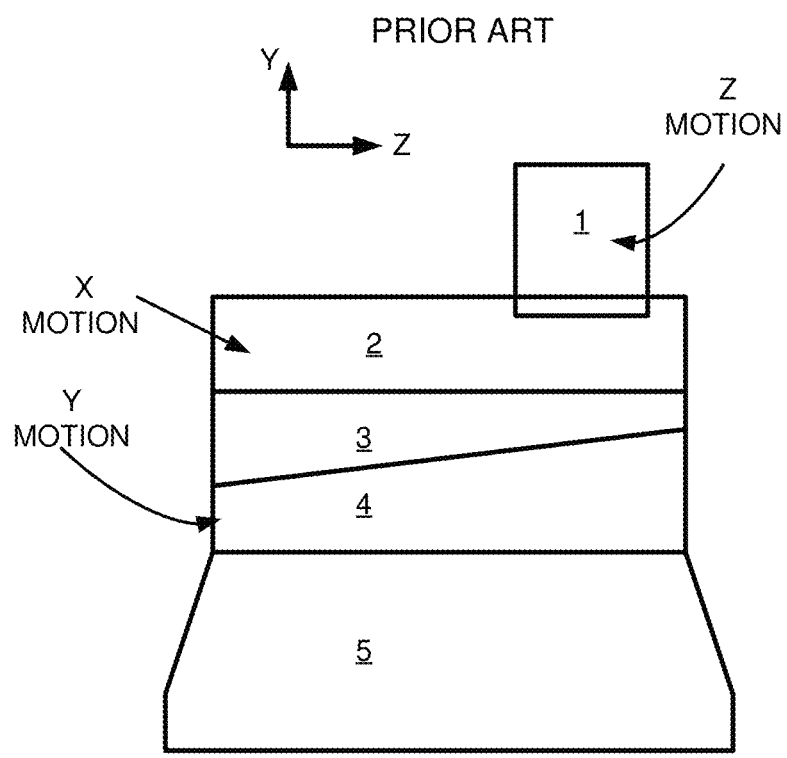
FIG. 3B schematically illustrates not to scale a prior art example apparatus for implementing an ultra-high stability long-vertical travel stage, such as the disclosed ultra-high stability long-vertical travel stage of U.S. Pat. No. 10,393, 242 B2.

Referring also to FIG. 3B, there is shown a prior art example apparatus for implementing an ultra-high stability long-vertical travel stage, such as the disclosed ultra-high stability long-vertical travel stage of U.S. Pat. No. 10,393, 242 B2. The disclosed ultra-high stability long-vertical travel stage of U.S. Pat. No. 10,393,242 B2 requires a considerable amount of space, limiting applications where the ultra-high stability long-vertical travel stage can be used. The disclosed ultra-high stability long-vertical travel stage stacks or connects the necessary axes of motion in a serial fashion, one axis of motion after the other axis of motion. The ultra-high stability stage 100 improves the disclosed ultra-high stability long-vertical travel stage of U.S. Pat. No. 10,393,242 B2 by reducing the space necessary to implement multiple axes of motion.

The ultra-high stability stage 100 uses two air bearing-guided components while the disclosed ultra-high stability long-vertical travel stage uses four air bearing-guided components. The ultra-high stability stage 100 enables five axes of motion with an overall smaller space requirement than the example apparatus of FIG. 3B which provides only three axes of motion. The ultra-high stability stage 100 provides combined degrees of freedom for the multiple axes of motion without requiring additional air bearing-guided components.

The ultra-high stability stage 100 including the granite base 102, driving wedge 104 and following wedge 106 is a substantially cheaper design than the five precision granite pieces of the illustrated example apparatus of FIG. 3B.

The ultra-high stability stage 100 including the granite base 102, driving wedge 104 and following wedge 106 can include various sized standard stages with the X, Y, Z, translation travel ranges of 25 mm for mass production. For example, the ultra-high stability stage 100 can be delivered as a single compact unit.

Figure 4:
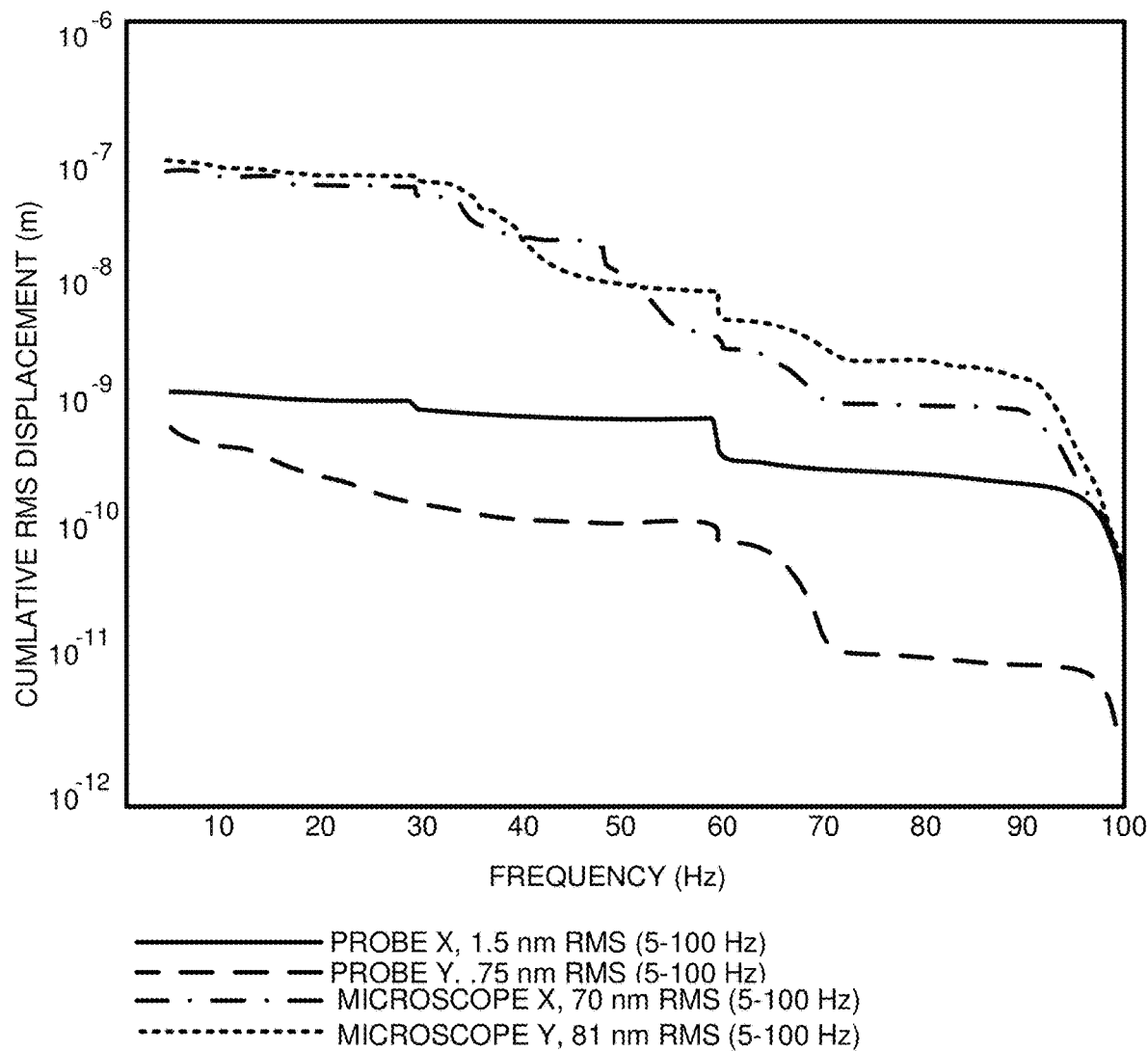
FIG. 4 is a chart illustrating an ultra-high stability stage operation enabled by the apparatus of FIGS. 1, 2, and 3A.
Figure 5:
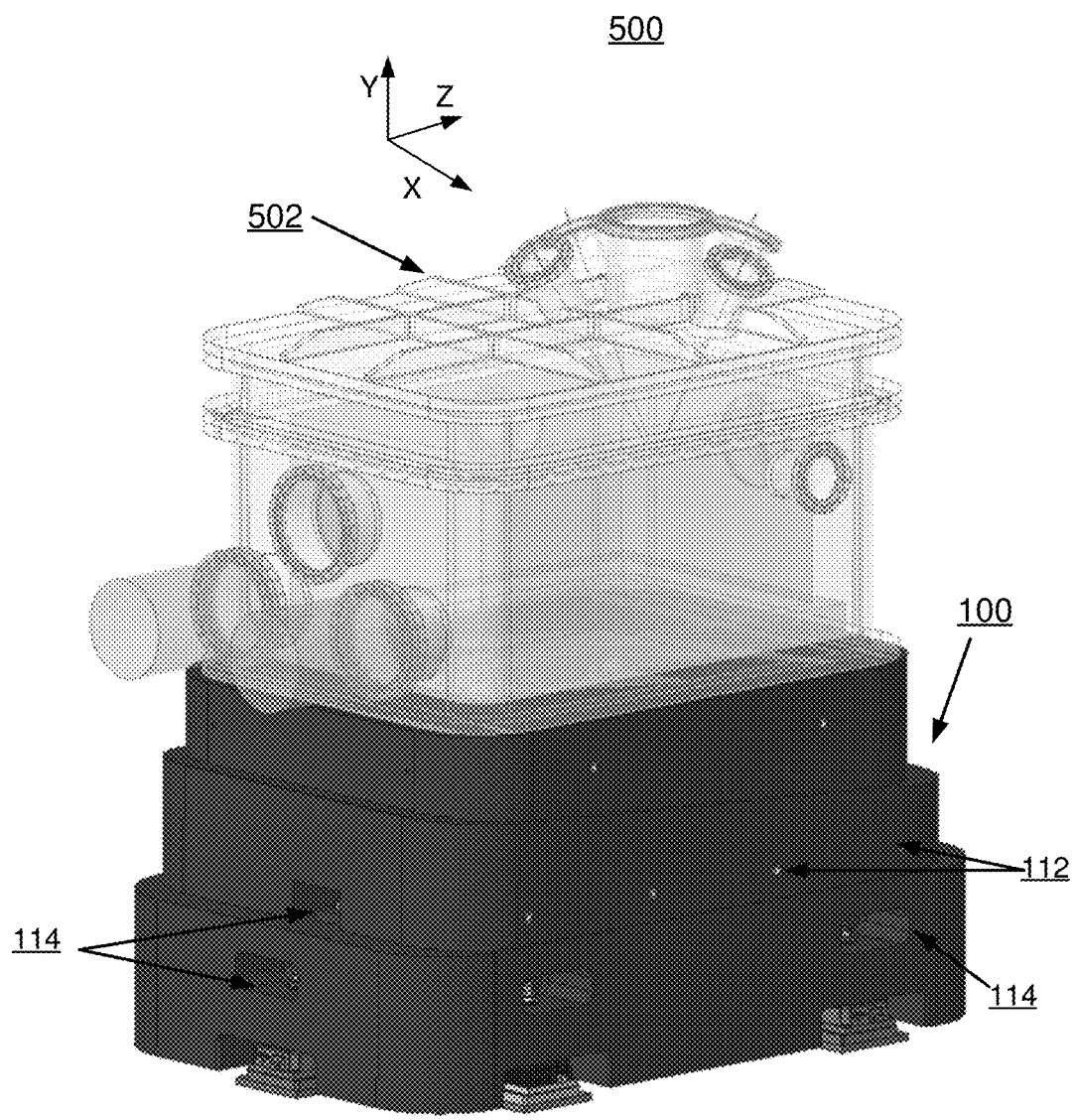
FIGS. 5-8 schematically illustrate not to scale the example apparatus of FIGS. 1, 2, and 3A for implementing an ultra-high stability stage combined degrees of freedom for multiple axes of motion in accordance with a preferred embodiment together with an example beamline precision instrument application.
Figure 6:
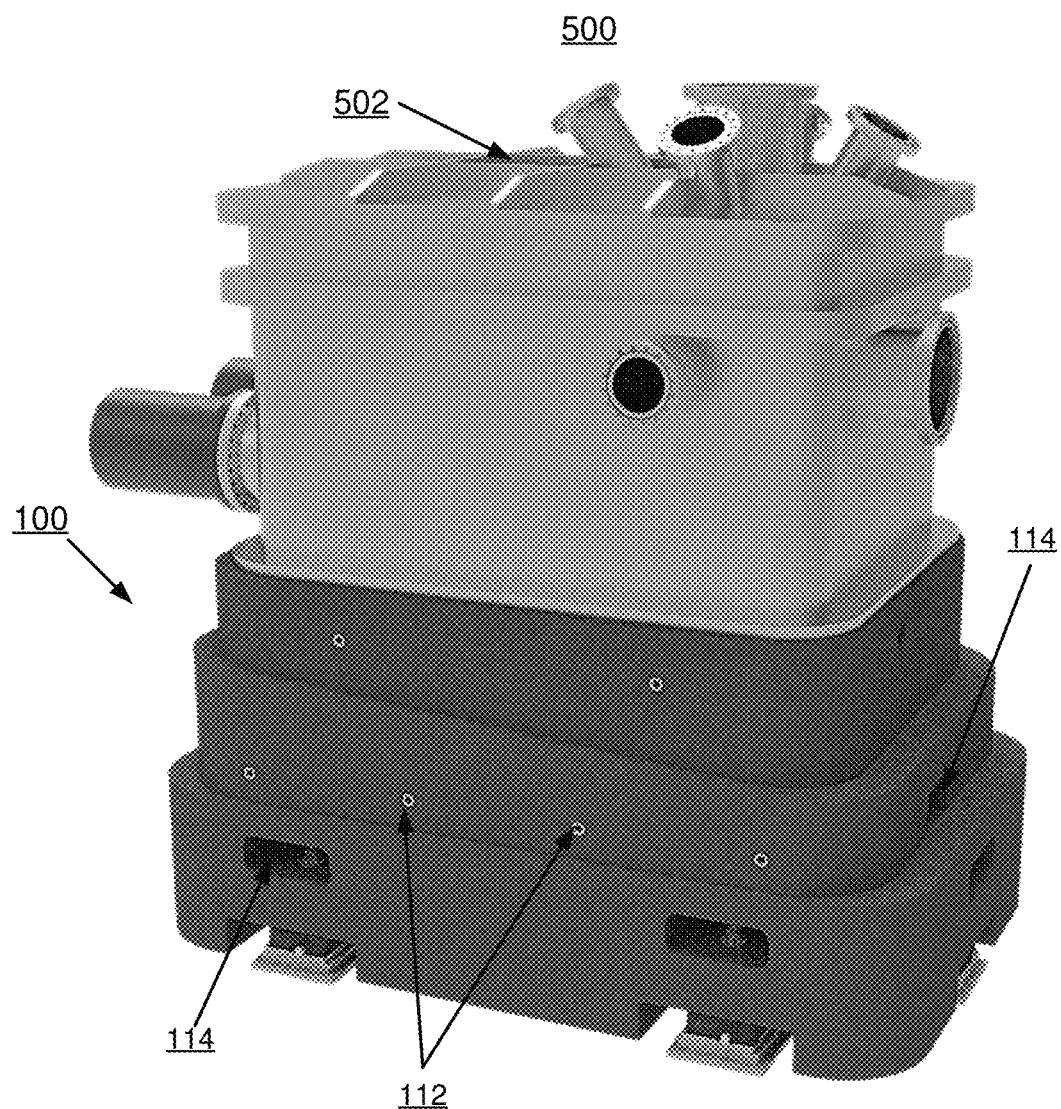

Referring to FIG. 4, a chart generally illustrates ultra-high stability stage operations, such as enabled by the apparatus of FIGS. 1, 2, and 3A. The illustrated lines of FIG. 4 show respective operations of example probe X and Y and microscope X and Y, as shown, with cumulative RMS (root mean square) displacement (m) shown relative the vertical axis and frequency (Hz) shown relative the horizontal axis. The ultra-high stability stage 100 achieves multiple axes of motion, including selected X, Y, Z translation axes, and rotation Y and rotation Z axes, with ultra-high stability, for example, at a nanometer (nm) level.

Referring also to FIGS. 5-8, example apparatus generally designated by the reference character 500 includes the ultra-high stability stage 100 together with an example beamline precision optics application or optics carrying stage generally designated by the reference character 502 in accordance with a preferred embodiment. The ultra-high stability stage 100 meets the needs of synchrotron radiation instrumentation and other applications where multiple axes of motion, including selected X, Y, Z translation axes, and rotation Y and rotation Z axes, are required. The ultra-high stability stage 100 combines the base, driving and following wedges, respective driving mechanics associated with each of the wedges, guiding components and integrated air bearings, enabling selected travel capability for multiple axes of motion. The ultra-high stability stage 100 is arranged to be inherently stable with the two wedge design for example, with the set travel of 25 mm, 25 mm, 25 mm, and selected angles of rotation Y and rotation Z, such as (0-25 degrees) with dynamic and thermal stability typically associated with a rigid structure.

As shown in FIGS. 5-8, the ultra-high stability stage 100 includes a plurality of pressurized air supply inputs 112 and selected access ports 114 for various connections within the base 102, driving wedge 104, and following wedge 106. The ultra-high stability stage 100 advantageously is adapted for use with selected types of actuation, for example, as disclosed in the disclosed ultra-high stability long-vertical travel stage of U.S. Pat. No. 10,393,242 B2. The selected types of force actuation with the motion components properly decoupled from the ultra-high stability stage 100, include for example, mechanical, electromagnetic, drive motors, stepper motor drive and guiding mechanisms, a piezo, allowing nanometer level steps, and the like.

Figure 7:
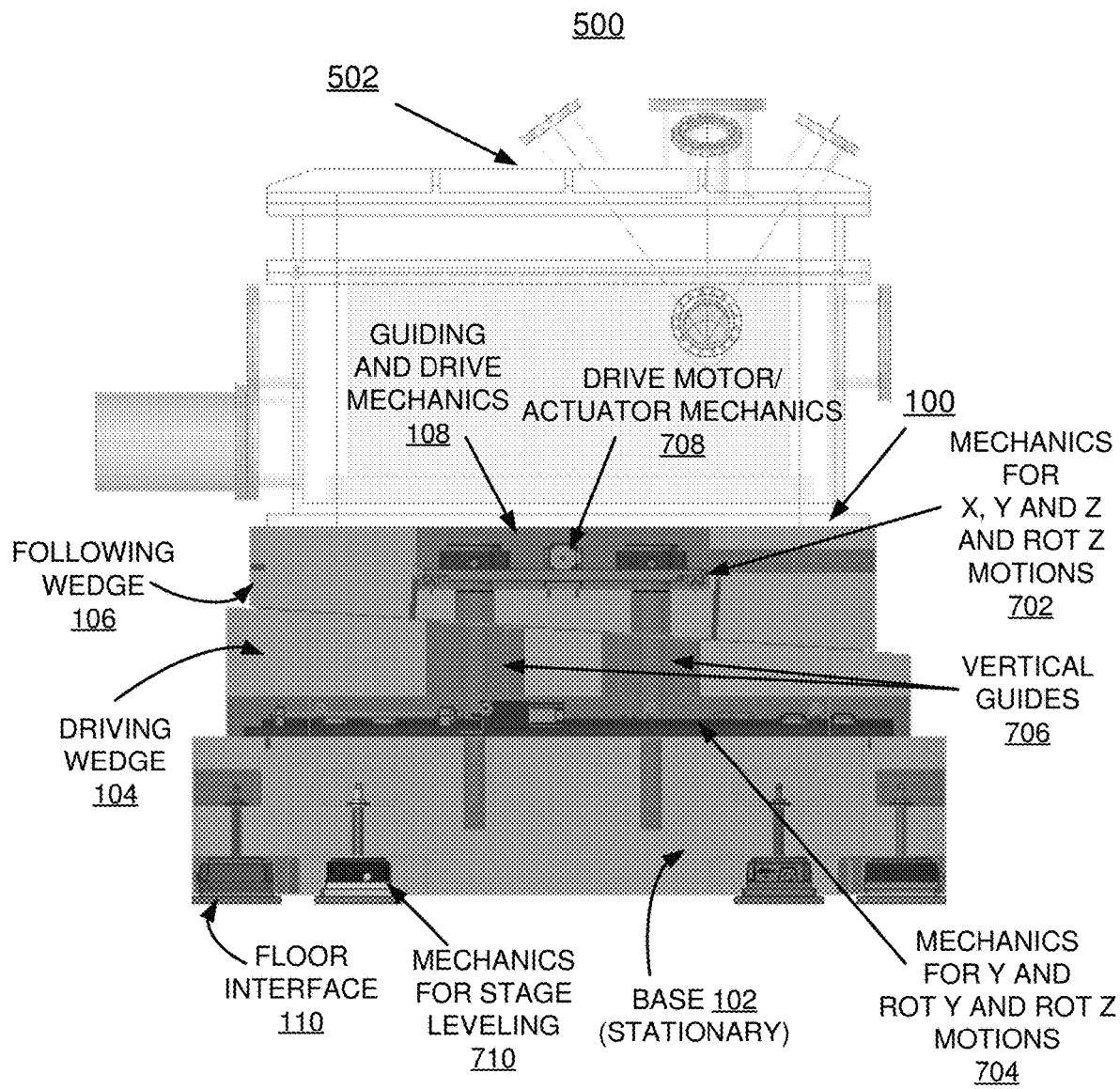

In FIG. 7, the base 102, driving wedge 104 supporting a following wedge 106, that are shown as transparent members to illustrate interior details. Each wedge 104, 106 is formed of a selected stable material, such as granite, low thermal expansion glass, and a nickel-iron alloy, such as Invar also known generically as FeNi36 (64FeNi in the US), notable for its uniquely low coefficient of thermal expansion (CTE). Each wedge 104, 106 forming the ultra-high stability stage 100 includes machined surfaces to provide sufficient flatness.

Figure 9:
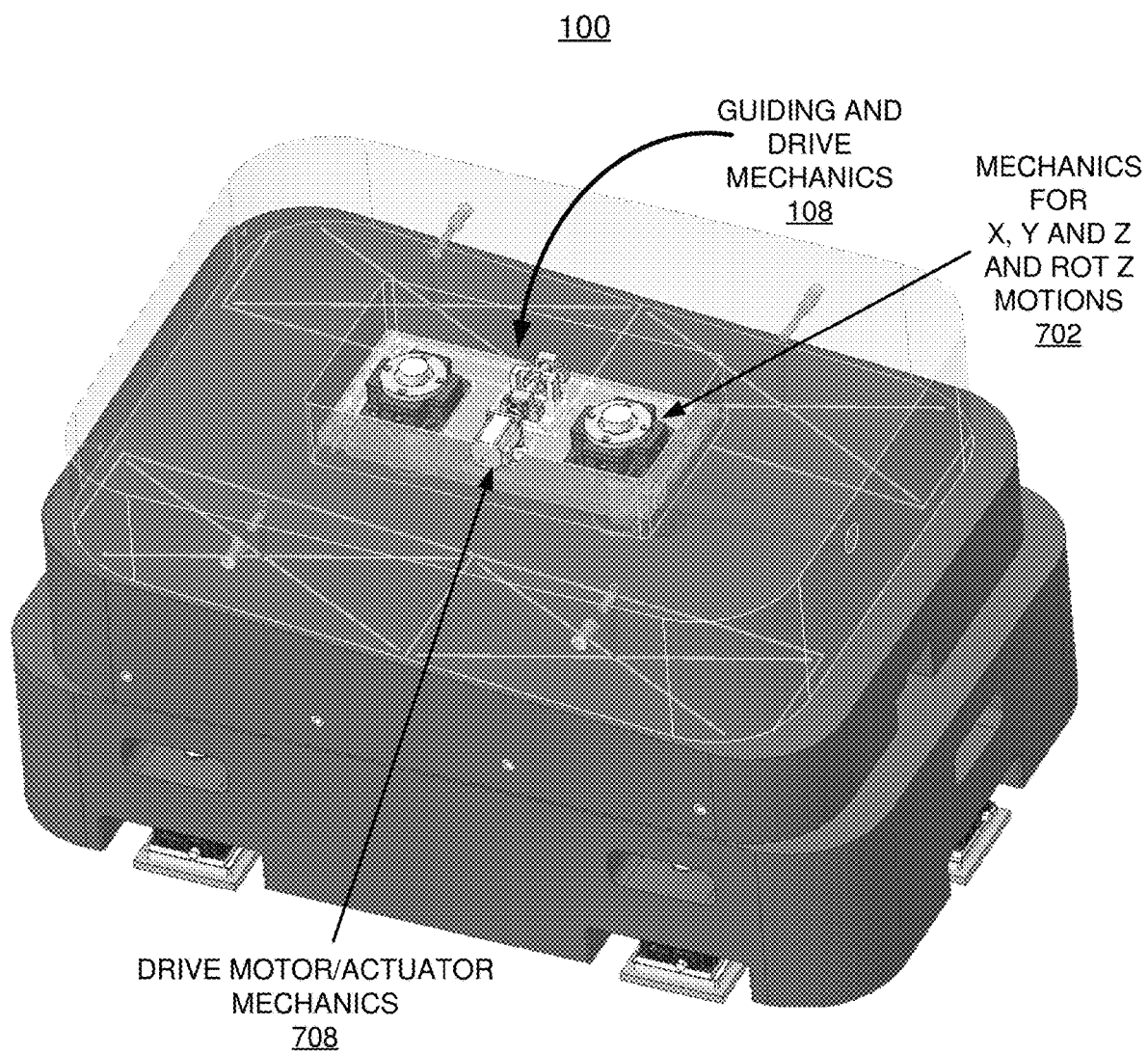
FIGS. 9 and 10 schematically illustrate not to scale the example apparatus of FIGS. 1, 2, 3A and FIGS. 5-8 for implementing an ultra-high stability stage combined degrees of freedom for multiple axes of motion in accordance with a preferred embodiment.
Figure 10:
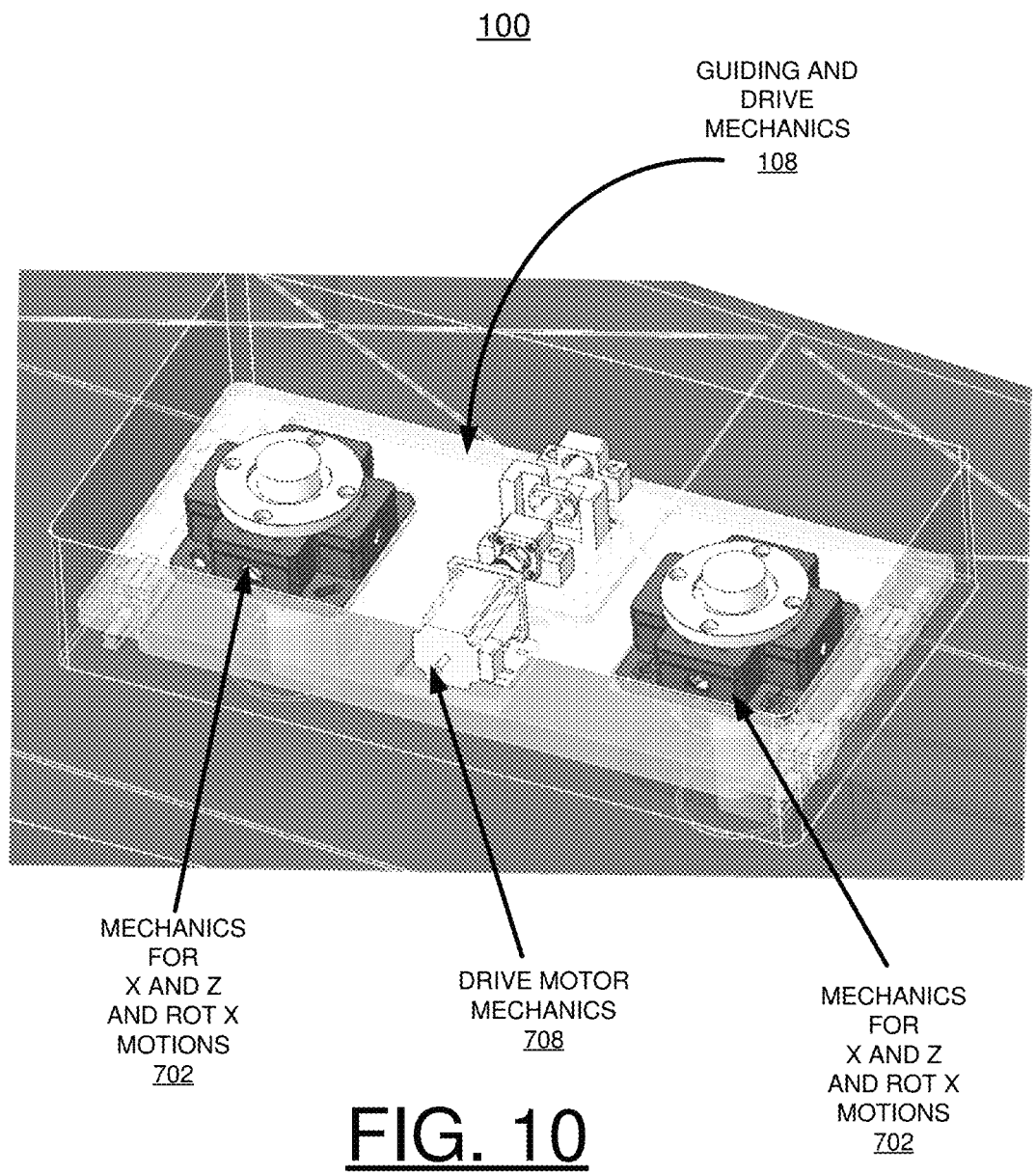

As shown in FIGS. 7, 9, and 10, mechanics for X, Y, Z, and rotation Z motions 702 are associated with the guiding and drive mechanics 108 in the following wedge 106. Mechanics for Y and rotation Y and rotation Z motions 704 are associated with guiding and drive mechanics 108 including vertical guides 706 in the driving wedge 104. The components of guiding and drive mechanics 108 and vertical guides 706 have selected degrees of freedom to enable movement about selected multiple axes of motion, such as X, Y, Z translation axes, and rotation Y and rotation Z axes with integrated air bearings lifted and the guiding components allowing for movement. The vertical guides 706 are provided with the driving wedge 104 to ensure vertical motion of the following wedge 106 with substantially coplanar interface with the driving wedge 102. As shown, the guiding and drive mechanics 108 in the following wedge 106 include drive motor/actuator mechanics 708. Mechanics for stage leveling 710 are provided with the stationary base 102 of the ultra-high stability stage 100.

Figure 8:
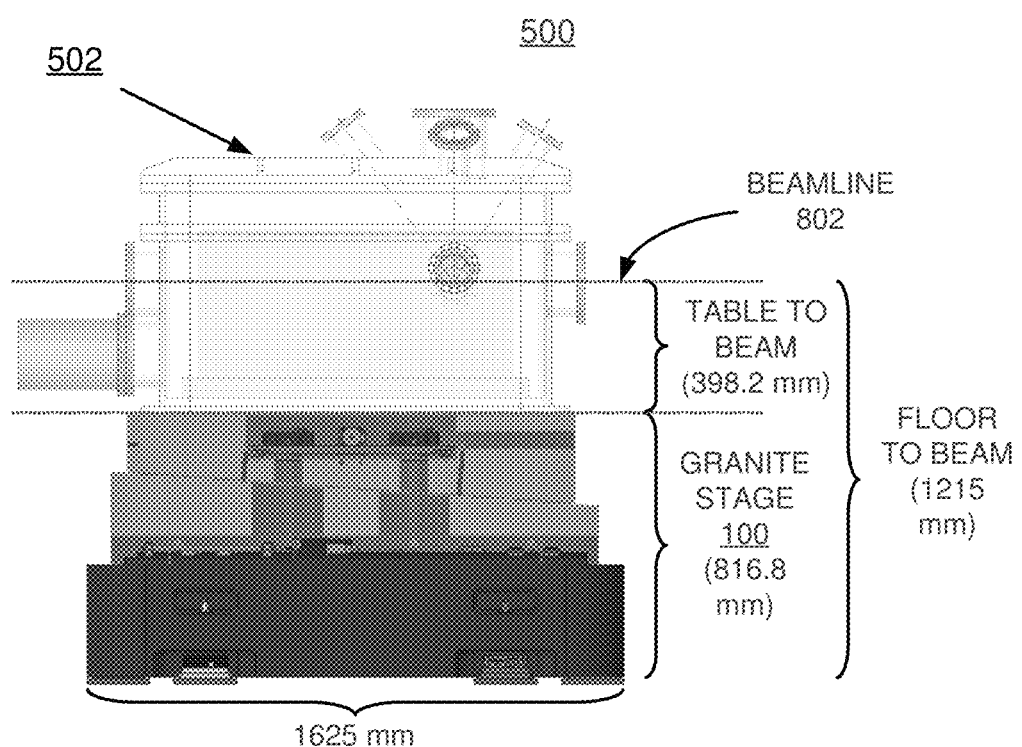

Referring to FIG. 8, example sizes are shown with the ultra-high stability stage 100 with the optics carrying stage 502 having a beamline 802. The illustrated example sizes include a side of the granite base 102 of 1625 mm, and the height of the granite stage 100 of 816.8 mm and a table to beam height of 398.2 mm providing a floor to beam height of 1215 mm. The ultra-high stability stage 100 while using the same number of air bearing-guided components as the disclosed ultra-high stability long-vertical travel stage of U.S. Pat. No. 10,393,242 B2, has an overall substantially smaller space requirement.

Referring now to FIGS. 11-25, schematically show not to scale example apparatus for implementing an ultra-high stability stage generally designated by the reference character 1100 with combined degrees of freedom for multiple axes of motion in accordance with another preferred embodiment. The ultra-high stability stage 1100 includes components and features similar to the ultra-high stability stage 100 with an additional intermediate wedge to enable movement about multiple axes of motion, such as X, Y, Z translation axes, and axes for rotation Y, rotation Z and additional rotation X.

Figure 11:
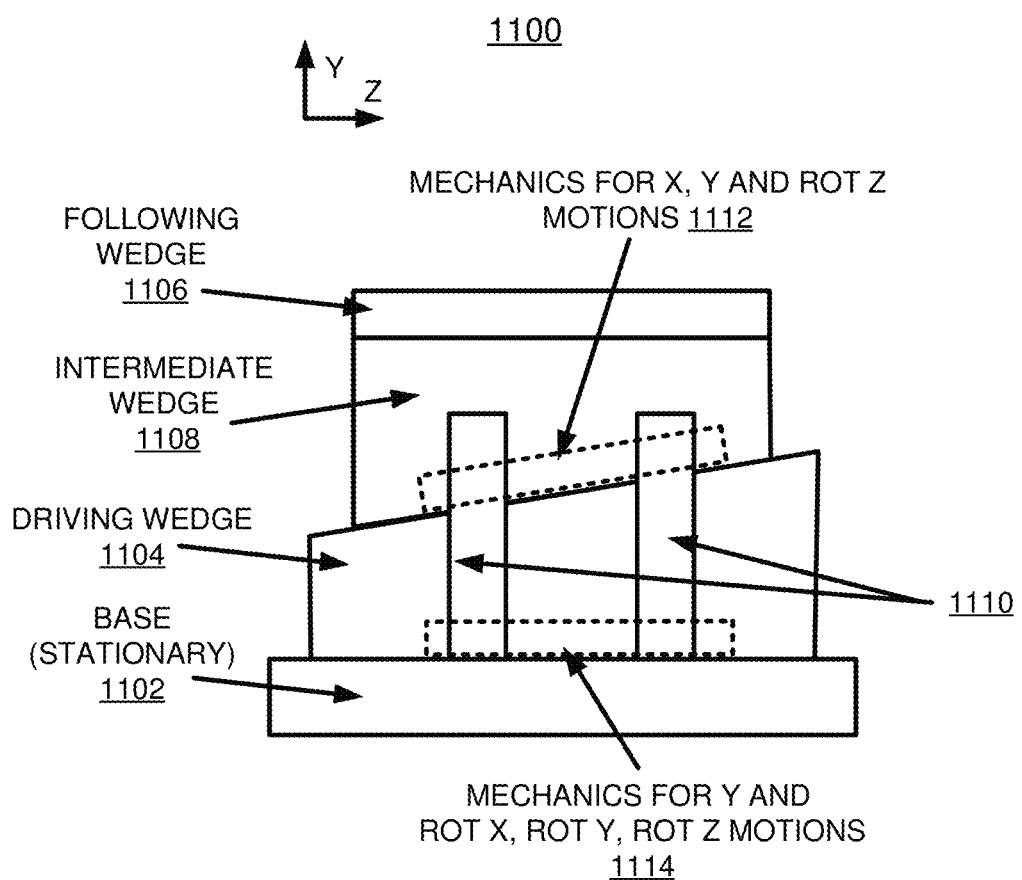
FIGS. 11-27 schematically illustrate not to scale a second example apparatus for implementing an ultra-high stability stage with combined degrees of freedom for multiple axes of motion in accordance with another preferred embodiment.
Figure 12:
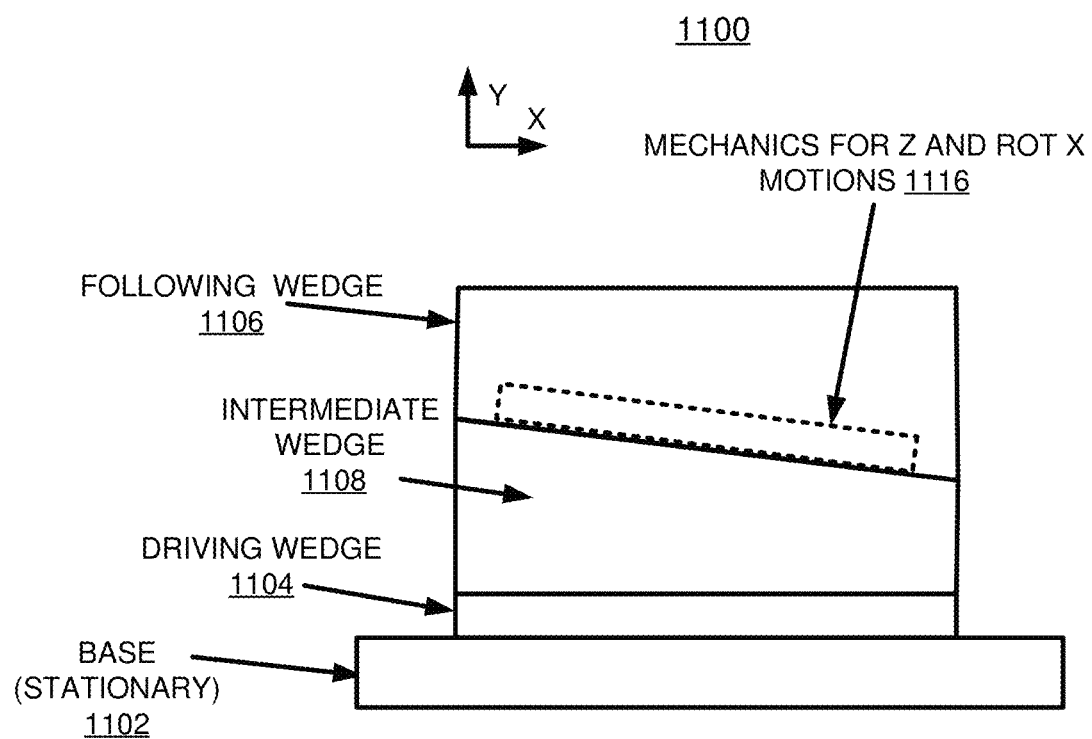

Referring first to FIGS. 11 and 12, the ultra-high stability stage 1100 includes a base 1102, a driving wedge 1104 supported by the base 1102, a following wedge 1106, and an intermediate wedge 1108 between the driving wedge 1104 and the following wedge 1106. The intermediate wedge 1108 supports the following wedge 1106. Each of the base 1102, the driving wedge 1104, the following wedge 1106, and the intermediate wedge 1108 have surfaces with predefined flatness. The base 1102 and each wedge 1104, 1106, 1108 are formed of a selected stable material having predefined rigidity and low thermal expansion coefficient, such as granite, a low thermal expansion glass, or a nickel-iron alloy. Integrated air bearings, respective driving mechanics associated with each of the wedges and guiding components having selected degrees of freedom enable movement about selected ones of multiple axes of motion, such as X, Y, Z translation axes, and rotation X, rotation Y and rotation Z axes with the integrated air bearings lifted and the guiding components allowing for movement of the driving wedge, the following wedge, and the intermediate wedge. Mechanics for operation of the ultra-high stability stage 1100 are similar to the ultra-high stability stage 100 with the additional mechanics associated with the intermediate wedge 1108.

Guiding components 1110 are provided with the driving wedge 1104 and the intermediate wedge 1108 to ensure vertical motion of the following wedge 1106 and the intermediate wedge 1108.

The intermediate wedge 1108 between the driving wedge 1104 and the following wedge 1106 includes driving mechanics for X, Y, and rotation Z motion 1112. The intermediate wedge 1108 enables motion about the additional rotation X axis as compared to the ultra-high stability stage 100. Motion about the rotational X and Y axes are enabled by rotation of the wedges 1104, 1106, 1108 about an axis normal to the guiding surfaces.

With intermediate wedge 1108 having two angular surfaces with lines defining the slope lying in planes perpendicular to one another, independent rotational X and Z motions are enabled. Mechanics for translation Y and rotation X, rotation Y and rotation Z motions 1114 are provided with the driving wedge 1104 for selected ones of translation Y and rotation X, rotation Y and rotation Z motions. As shown in FIG. 12, driving mechanics for translation X, Y, Z and rotation Z motions 1116 are provided with the following wedge 1106 for selected ones of translation X, Y, Z and rotation Z motions.

The ultra-high stability stage 1100 is useful for various applications where more degrees of freedom for multiple axes of motion is enabled and additional space is available than required for the ultra-high stability stage 100. The ultra-high stability stage 1100 is particularly suited to a similar wide variety of applications, including for example X-ray microscopes, beamline optic component supports, synchrotron beamline precision instrument supports, accelerator magnet supports, accelerator beam position monitor supports, and semiconductor fabrication machines. The ultra-high stability stage 1100 can provide an arbitrary travel range about selected ones of multiple axes of motion, such as X, Y, Z translation axes, and selected ones of rotation X, rotation Y and rotation Z axes with dynamic and thermal stability typically associated with a rigid structure. The ultra-high stability stage 100 remains highly stable with substantial travel range about selected multiple axes of motion, providing large load capacity.

For example, the ultra-high stability stage 1100 is arranged to be inherently stable with the two wedge design for example, with the set travel of 25 mm, 25 mm, 25 mm, and for selected angle for selected ones of rotation X, rotation Y and rotation Z axes, such as respectively (between −5 and +5 degrees, between 0–25 degrees and between −5 and +5 degrees) with dynamic and thermal stability typically associated with a rigid structure.

Referring now to FIGS. 13-27, example operations are schematically shown not to scale for the ultra-high stability stage 1100.

Figure 13:
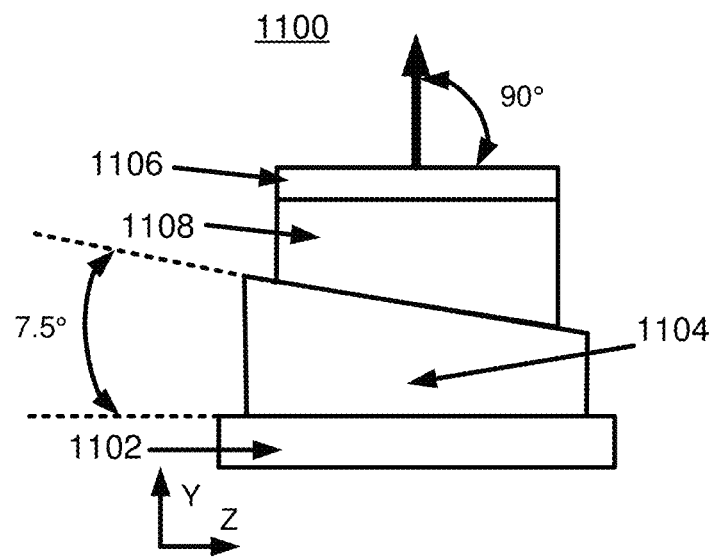
Figure 14:
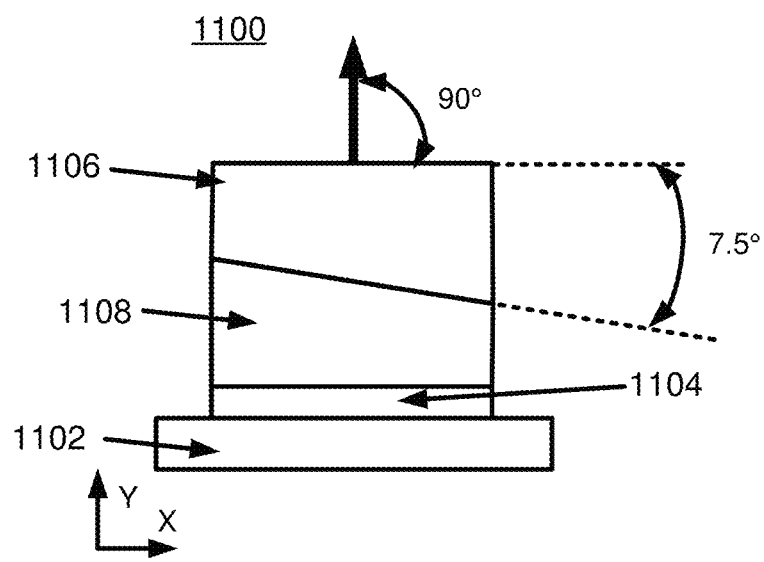
Figure 15:
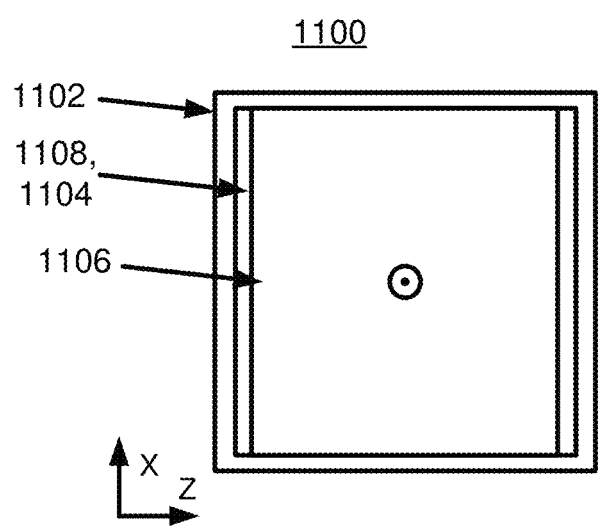

FIGS. 13, 14 and 15 respectively provide an example front view, side view and top view of the ultra-high stability stage 1100 illustrating an example center of travel for the ultra-high stability stage 1100.

Figure 16:
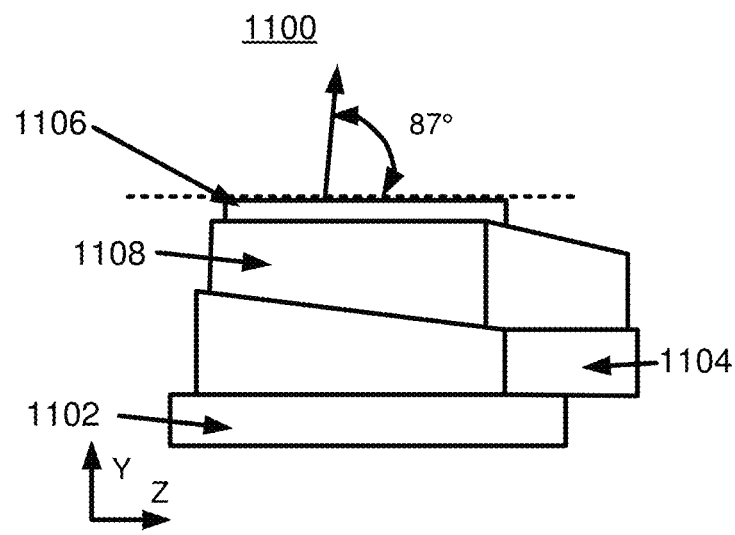
Figure 17:
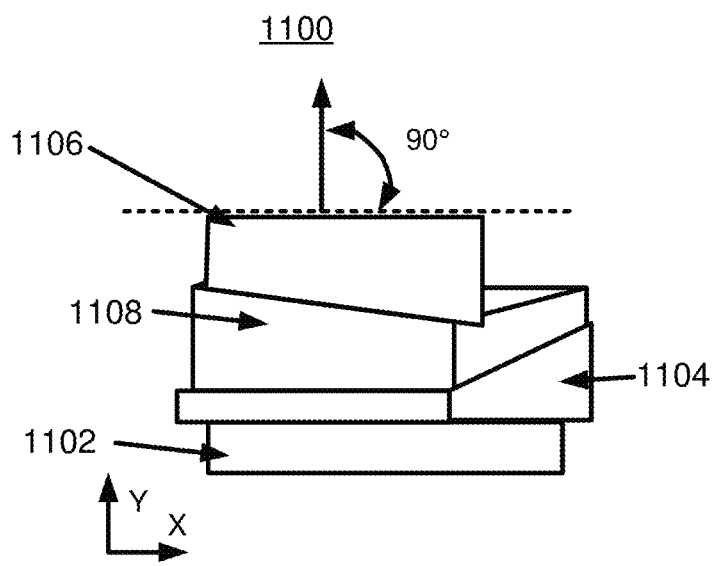
Figure 18:
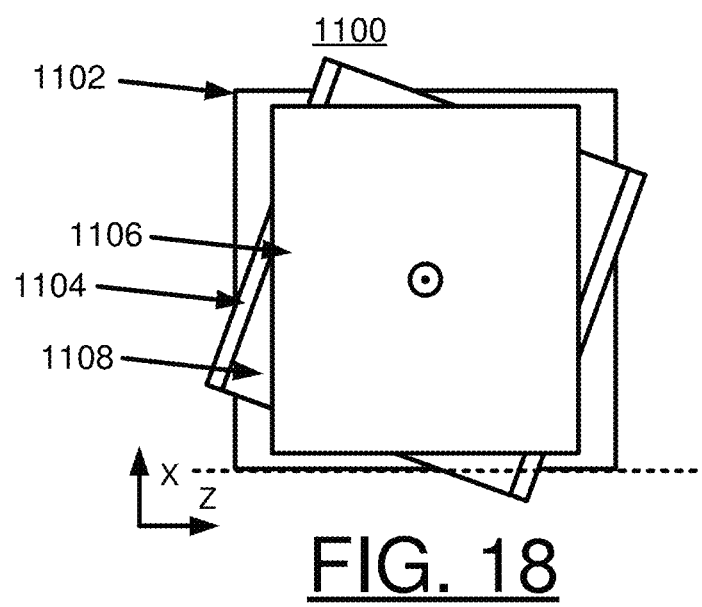

FIGS. 16, 17 and 18 respectively provide an example front view, side view and top view of the ultra-high stability stage 1100 illustrating an example rotation X travel for the ultra-high stability stage 1100.

Figure 19:
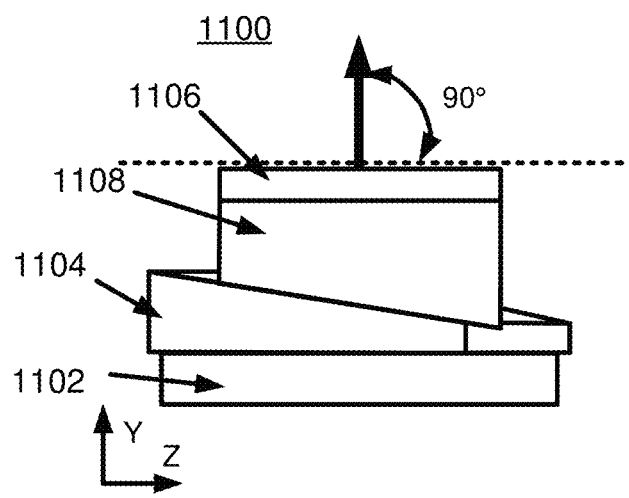
Figure 20:
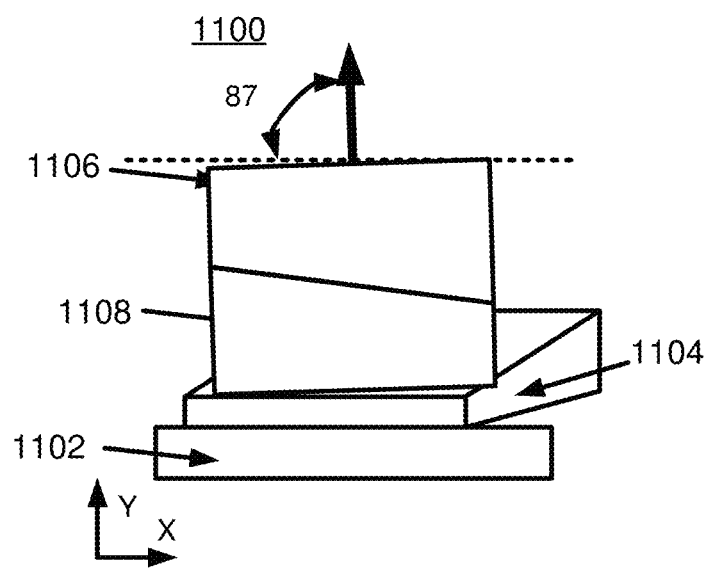
Figure 21:
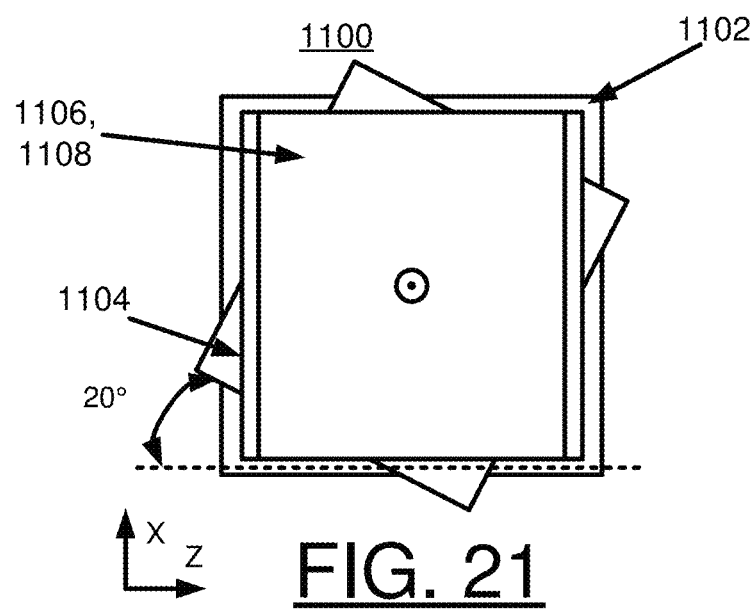

FIGS. 19, 20 and 21 respectively provide an example front view, side view and top view of the ultra-high stability stage 1100 illustrating an example rotation Z travel for the ultra-high stability stage 1100.

Figure 22:
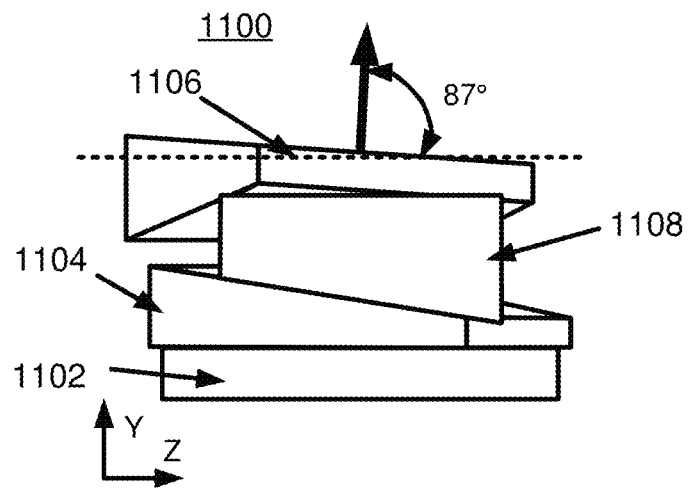
Figure 23:
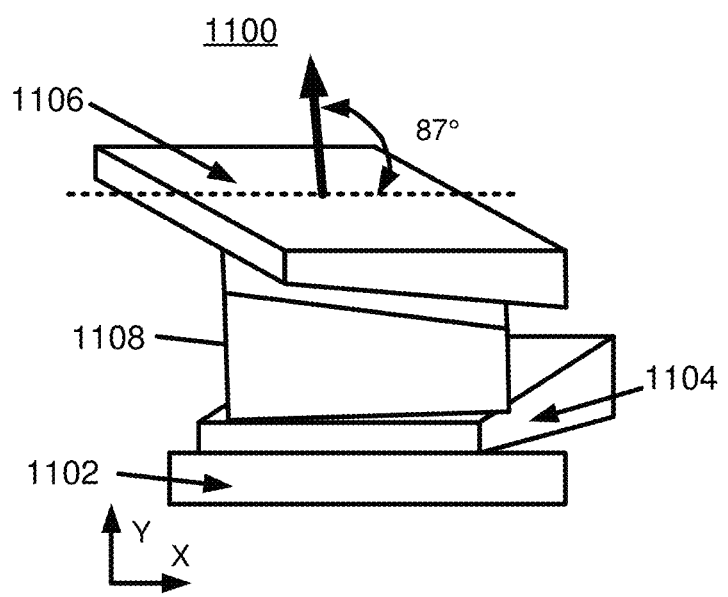
Figure 24:
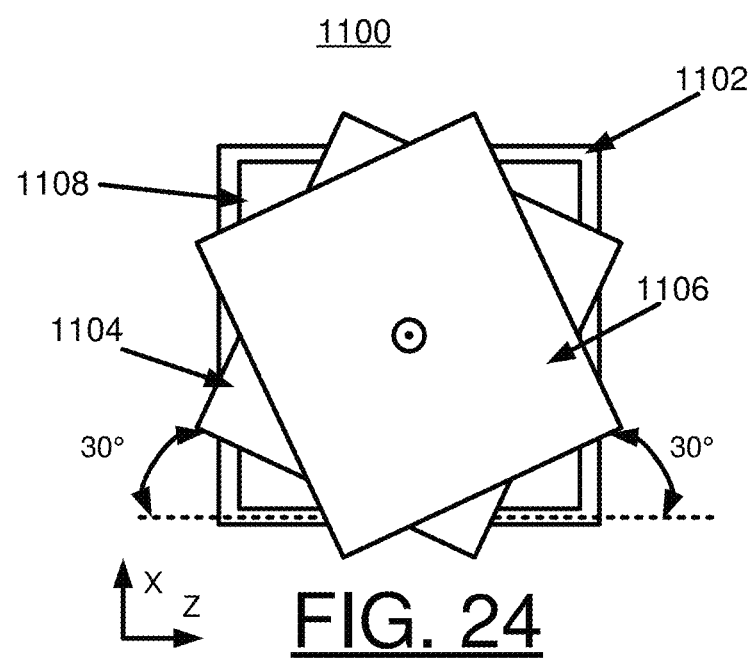

FIGS. 22, 23 and 24 respectively provide an example front view, side view and top view of the ultra-high stability stage 1100 illustrating an example rotation X and translation Z travel for the ultra-high stability stage 1100.

Figure 25:
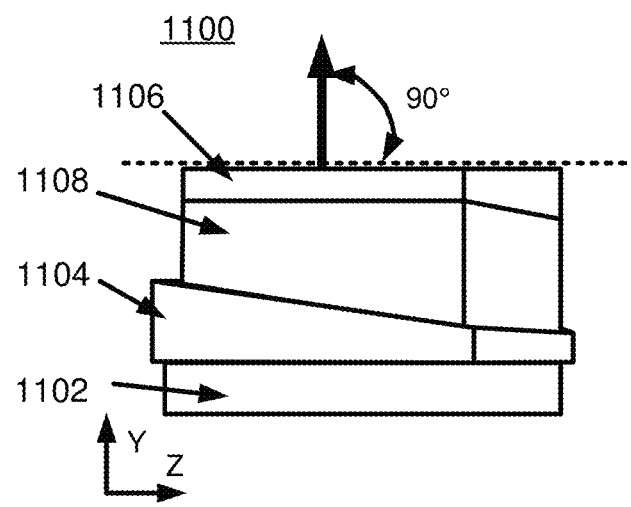
Figure 26:
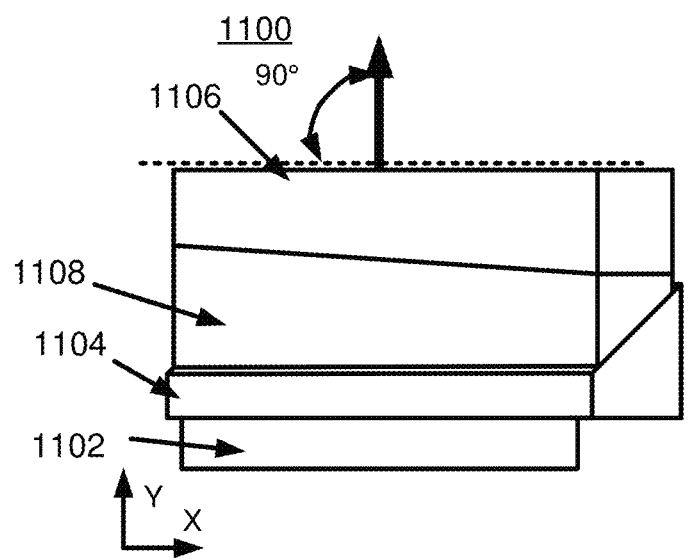
Figure 27:
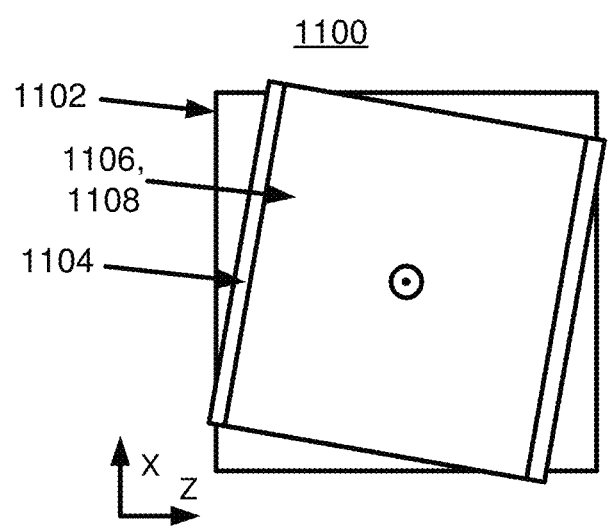

FIGS. 25, 26 and 27 respectively provide an example front view, side view and top view of the ultra-high stability stage 1100 illustrating an example rotation Y travel for the ultra-high stability stage 1100.

While the present invention has been described with reference to the details of the embodiments of the invention shown in the drawing, these details are not intended to limit the scope of the invention as claimed in the appended claims.

What is claimed is:

1. An apparatus for implementing an ultra-high stability stage with combined degrees of freedom for multiple axes of motion comprising:
   a base;
   a driving wedge supported by the base and supporting a following wedge, the base and each wedge formed of a selected stable material having predefined rigidity and low thermal expansion coefficient; the driving wedge and following wedge having machined surfaces providing predefined flatness;
   integrated air bearings, respective driving mechanics, and guiding components associated with the driving wedge and following wedge having selected degrees of freedom and enabling movement with an arbitrary travel range and dynamic and thermal stability about selected ones of the multiple axes of motion including multiple translational axes motions including 25 mm and rotation axes motions including 1-25 degrees with the integrated air bearings lifted and the guiding components allowing for movement of the driving wedge and the following wedge about the selected multiple axes of motion and enables minimizing space required for the ultra-high stability stage to implement the multiple axes of motion without requiring additional air bearing-guided wedges.

2. The apparatus as recited in claim 1 wherein the guiding components having selected degrees of freedom enable maintaining a substantially co-planar interface of the driving wedge and the following wedge during movement and setting with an overall minimized space requirement.

3. The apparatus as recited in claim 1 wherein the guiding components having selected degrees of freedom are provided with the driving wedge ensuring vertical motion of the following wedge motion with an overall minimized space requirement.

4. The apparatus as recited in claim 1 wherein respective driving mechanics are provided with the following wedge for translation X, Y and Z and rotation Z motions with an overall minimized space requirement.

5. The apparatus as recited in claim 1 wherein respective driving mechanics are provided with the driving wedge for translation Y and rotation Y and rotation Z motions with an overall minimized space requirement.

6. The apparatus as recited in claim 1 wherein wedge-to-wedge contact when the ultra-high stability stage is not in motion yields stability and rigidity substantially the same as a solid member and enables carrying a beamline optics carrying stage at a nanometer (nm) level.

7. The apparatus as recited in claim 1 wherein the base and each wedge formed of a selected stable material having predefined rigidity and low thermal expansion coefficient providing rigidity and stability including a selected one of granite, a low thermal expansion glass and a nickel-iron alloy.

8. An apparatus for implementing an ultra-high stability stage with combined degrees of freedom for multiple axes of motion comprising:
   a base;
   a driving wedge supported by the base, a following wedge, and the driving wedge supporting the following wedge; the base and each wedge formed of a selected stable material having predefined rigidity and low thermal expansion coefficient providing rigidity and stability including a selected one of granite, a low thermal expansion glass and a nickel-iron alloy;
   integrated air bearings, respective driving mechanics, and guiding components associated with each of the wedges having selected degrees of freedom and enabling movement about the selected ones of multiple axes of motion with the integrated air bearings lifted and the guiding components allowing for movement of the driving wedge, and the following wedge, about the selected ones of multiple translational axes of motion and rotation axes of motion and minimizing space required to implement the multiple translational and rotation axes of motion including selected X, Y, Z translation axes, and rotation Y and rotation Z axis with the ultra-high stability stage.

9. The apparatus as recited in claim 8 wherein the guiding components having selected degrees of freedom are provided with the driving wedge ensuring vertical motion of the following wedge with an overall minimized space requirement.

10. The apparatus as recited in claim 8 wherein driving mechanics are provided with the following wedge for translation X, Y, Z and rotation Z motions with an overall minimized space requirement.

11. The apparatus as recited in claim 8 wherein driving mechanics are provided with the driving wedge for translation Y and rotation X, rotation Y, and rotation Z motions with an overall minimized space requirement.

12. The apparatus as recited in claim 8 wherein guiding components and driving mechanics are provided with the following wedge for translation X, Y Z and rotation Z motions with an overall minimized space requirement.

* * * * *